(12) United States Patent
Schmitt

(10) Patent No.: US 6,259,605 B1
(45) Date of Patent: Jul. 10, 2001

(54) FRONT ACCESSIBLE COMPUTER AND CHASSIS

(75) Inventor: Ty Schmitt, Round Rock, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/218,001

(22) Filed: Dec. 22, 1998

(51) Int. Cl.[7] ................................................ G06F 1/16
(52) U.S. Cl. ....................... 361/727; 361/724; 361/725; 361/726
(58) Field of Search .................................. 361/724–727

(56) References Cited

U.S. PATENT DOCUMENTS

| | | |
|---|---|---|
| 4,901,202 | 2/1990 | Leschinger . |
| 4,964,017 | 10/1990 | Jindrick et al. . |
| 5,587,877 * | 12/1996 | Ryan et al. ........................ 361/683 |
| 5,717,570 | 2/1998 | Kikinis . |
| 5,740,020 | 4/1998 | Palatov . |
| 5,754,396 * | 5/1998 | Felcman et al. .................... 361/683 |
| 5,896,273 * | 4/1999 | Varghese et al. .................. 361/724 |

* cited by examiner

*Primary Examiner*—Leo P. Picard
*Assistant Examiner*—Yean-Hsi Chang
(74) *Attorney, Agent, or Firm*—Haynes and Boone, LLP

(57) ABSTRACT

A chassis for a computer, or the like, according to which a cover is provided for the top of the chassis and is slidable towards the front of the chassis to permits its removal without removing the chassis from a rack system. At least one fastener extends through a flange extending from the cover and over the front wall of the chassis for attaching the cover to the chassis. A bezel is provided for the front of the chassis and covers the fastener.

10 Claims, 2 Drawing Sheets

FRONT ACCESSIBLE COMPUTER AND CHASSIS

BACKGROUND

The present disclosure relates to a computer and a method for assembling and disassembling a computer, and, more particularly, to such a system and method in which one or more covers of the computer can be easily removed while the computer is in a rack system to permit access to the interior of the computer.

In large installations involving a plurality of computers, such as mini-tower or mid-tower computers, including those in the form of servers, the individual computers are usually placed on a rack mount system formed by a cabinet having a plurality of vertically space bays. In these installations, the computer is usually placed in a horizontal position on the shelf on one of its sides to minimize the amount of vertical space that is occupied by the computer. Although these arrangements are desirable from a space efficiency standpoint, they are less than desirable when one or more of the computers must be serviced. For example, because it is virtually impossible to service the computer when it is in the rack mount system, the computers must either be manually rotated to an upright position to permit one or both of its side covers to be removed for service, or be completely removed from the shelves and placed on some other surface for service. Both of these techniques are time-consuming. Moreover, in both techniques, several cables must often be disconnected and reconnected at the back of the computer where space is often limited, which adds to the problems.

In an effort to eliminate these problems, some rack systems provide for slidable movement of the computers outwardly from the rack to provide better access to the computers. However, in this position, it is still very difficult to remove a side cover from the chassis of the computer especially because most computers are designed so that its cover must be moved towards the rear of the computer chassis to permit its removal.

Therefore, what is needed is a computer that can rest on one of its side walls in a rack system, can be extended outwardly from the rack, yet can easily be serviced while residing in the system without having to be removed or rotated.

SUMMARY

The present disclosure is thus directed to a chassis for a computer having a chassis provided with at least one cover that can easily be removed while the computer is in a rack system by moving it towards the front of the chassis to permit access to the interior of the computer. To this end, the cover is slidable towards the front of the chassis to permits its removal without removing the chassis from a rack system. At least one fastener extends through the cover for attaching the cover to the chassis. A bezel is provided for the front of the chassis and covers the fastener.

A major advantage is achieved with the system and method of the present disclosure because all the space-efficiency advantages of a rack mount system are retained while the computer is easily positioned for service without having to remove it from the latter system.

DESCRIPTION OF THE PREFERRED EMBODIMENT

Figure 1:
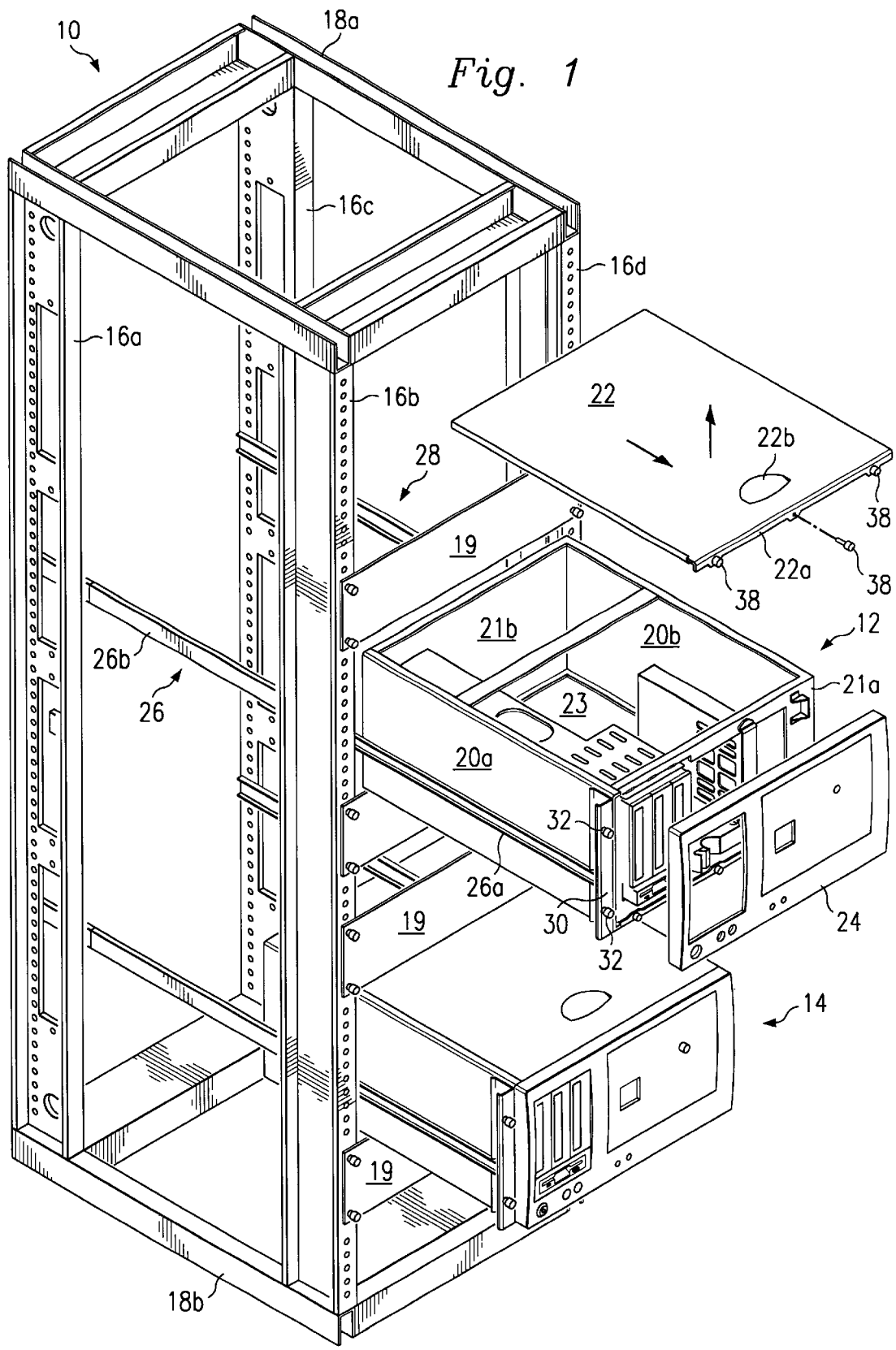
FIG. 1 is an isometric view of a rack mount system depicting two computers, one of which is exploded, having features according to one embodiment.

Referring to FIG. 1 of the drawings, the reference numeral 10 refers, in general, to rack system which is designed to store a plurality of computers, two of which are shown in general by the reference numerals 12 and 14. The rack system 10 is formed by four spaced upright members 16a–16d which form the corners of the system. A top frame assembly 18a and a bottom frame assembly 18b are respectively attached to the upper ends and the lower ends of the members 16a–16d in any known manner, and a plurality of front plates 19 extend between, and are mounted to, the members 16b and 16d in any known manner. The plates 19 extend in a spaced relationship and one of the plates 19 extends between each pair of adjacent computers, including the computers 12 and 14, that reside in the rack system.

The computer 12 is in the form of a server and has a chassis formed by two spaced parallel walls 20a and 20b, and two spaced parallel walls 21a and 21ba connected at their ends to corresponding end of the walls 20a and 20b to form a rectangular, open-ended enclosure. A cover 22 extends over the upper end of the enclosure formed by the walls 20a, 20b, 21a and 21b, as viewed in FIG. 1, and a cover 23 extends over the lower end of the enclosure.

The computer 12 is oriented in a horizontal position in the rack system 10 to minimize the amount of vertical space that it occupies. In this position, the cover 22 extends horizontally and forms the top of the chassis, the cover 23 forms the bottom of the chassis, the walls 20a and 20b form the side walls, and the walls 21a and 21b form the front wall and the rear wall, respectively. Preferable the walls 20a, 20b, 21a, and 21b, as well as the covers 22 and 23, are formed by stamped sheet metal in a conventional manner.

A bezel 24, preferably of a plastic material, extends over the wall 21a and is attached to the chassis of the computer 12 in a manner to be described.

The computer 12 is attached to the upright members 16a and 16b by a slide assembly 26, and to the upright members 16c and 16d by a slide assembly 28, to enable the computer to be moved from a retracted position to an extended position shown in FIG. 1. The slide assembly 26 includes a rail 26a fastened to the wall 20a of the computer 12, and a rail 26b affixed to the members 16a and 16b. The rails 26a and 26b are disposed in a telescoping relation, and it is understood that ball bearings (not shown) extend between the rails to permit slidable movement between the rails. The slide assembly 26 is also provided with a locking mechanism (not shown) to lock the computer 12 in an extended position and which can be manually released to permit the computer to slide to its retracted position within the rack system 10. Because the slide assembly 26 is conventional and, for example, can be of the type manufactured by General Devices of Indianapolis, Ind. and is well documented in their promotional materials which are incorporated by reference, it will not be described in any further detail. The slide assembly 28 is connected to the wall 20b of the computer 12 and to the members 16c and 16d and, beacause it is identical to the slide assembly 26, it will not be described in detail.

An angle iron bracket 30 is mounted on the wall 20a of the computer 12 near the front end thereof and receives a pair of captive thumbscrews 32 that extend in corresponding openings in the upright member 16b to lock the computer 12 in its retracted position in the system 10. Although not shown in the drawings, it is understood that a bracket, identical to the bracket 30, is mounted on the wall 20b of the computer 12 and receives thumbscrews that extend in corresponding openings in the member 16d.

Figure 2:
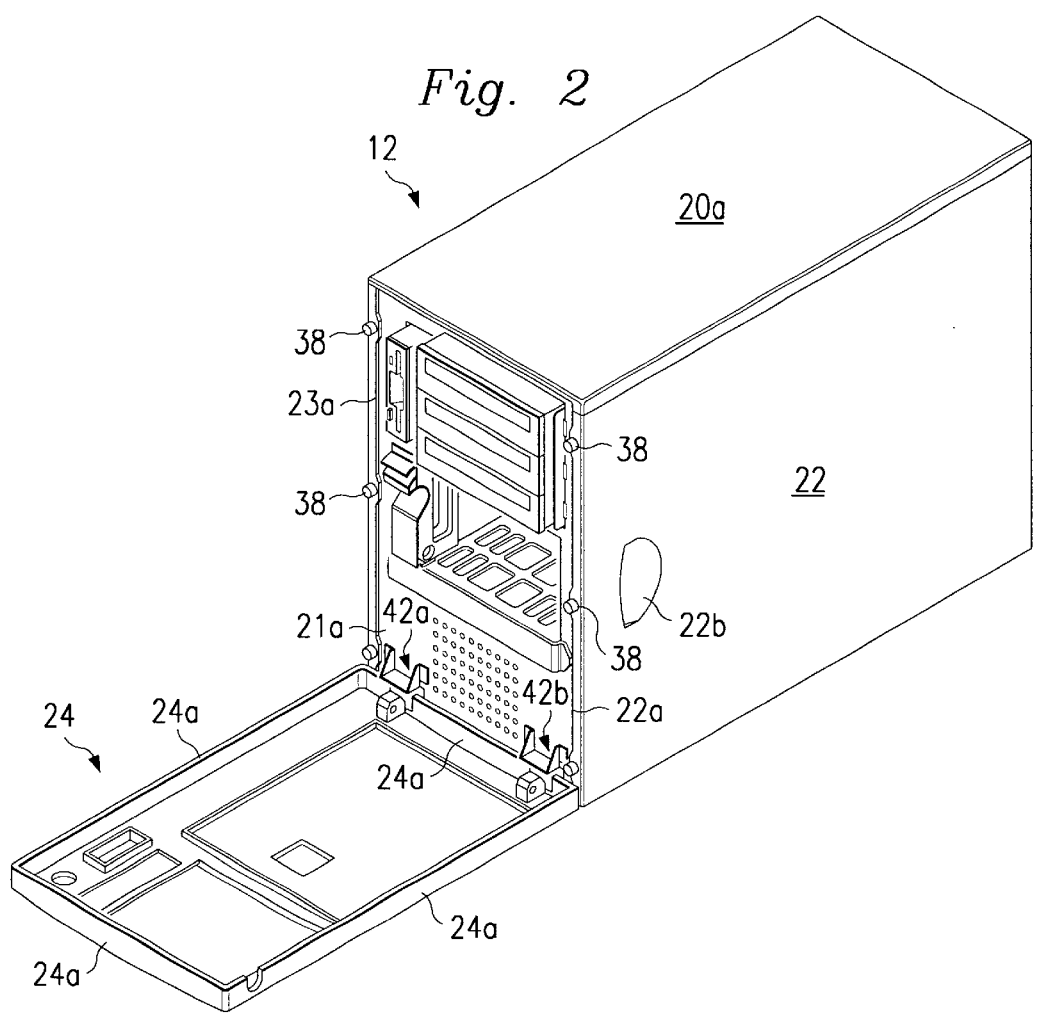
FIG. 2 is an isometric view depicting one of the computers of FIG. 1.

As shown in FIGS. 1 and 2, the cover 22 has a flange 22a at one end thereof which is formed by bending the end portion at approximately right angles to the remaining portion of the cover. The flange 22a is provided with three opening for receiving three screws 38 that also extend through corresponding openings (not shown) formed in the chassis of the computer 12 to attach the cover 22 to the chassis. A handle 22b is also formed on the outer surface of the cover 22 to facilitate its removal from the chassis of the computer 12, in a manner to be described. It is understood that the cover 23 is identical to the cover 22 and, as such, has a flange 23a (FIG. 2) which is identical to the flange 22a of the cover 22 and is attached to the chassis by additional screws 38.

As better shown in FIG. 2, the bezel 24 is mounted to the chassis of the computer in a manner so that it can be pivoted between an open position shown in FIG. 2 and a closed position in which it extends over the wall 21a of the chassis. In the open position of the bezel 24 shown in FIG. 2, portions of several standard components of the computer 12, including a plurality of hard drives and a floppy disc drive, which extend through the wall 21a, are exposed. In its closed position, the bezel 24 covers these components as well as the flanges 22a and 23a and the screws 38 associated with both flanges.

The above-mentioned pivotal movement of the bezel 24 is permitted by two spaced hinge assemblies 42a and 42b that connect one end of the bezel 24 to the chassis of the computer 12. As shown in FIG. 1, the hinge assemblies 42a and 42b also permit the bezel 24 to be removed from the chassis of the computer 12 by pivoting the bezel to the position shown in FIG. 2 and then pulling the bezel away from the chassis. Because the hinge assemblies 42a and 42b are conventional, they will not be described in any further detail.

As shown in FIG. 2, the bezel 24 is in the form of a plate having its marginal edge portions bent inwardly to form four flanges 24a. The bezel 24 is installed over the wall 20a by simply connecting the hinge assemblies 42a and 42b and moving the bezel towards the wall 21a until the flanges 24a engage corresponding surfaces of the chassis of the computer 12.

The computer 14 is identical to the computer 12 and is mounted in the rack system 10 in the same manner. The computer 14 is shown in FIG. 1 in its assembled condition.

Assuming that the computer 12 is installed in its retracted position in the system 10 and needs to be serviced, the thumbscrews 32 on the bracket 30 and the other above-mentioned bracket are loosened. Then the computer 12 is then pulled outwardly until it reaches its extended position shown in FIG. 1, where the locking tabs associated with the slide assemblies 26 and 28 lock to retain the computer in this position.

With the computer 12 in its extended position in the rack system 10 shown in FIG. 1, the bezel 24 is removed from the chassis of the computer 12 by pivoting it to the position shown in FIG. 2 and then pulling it away from the chassis to release it and expose the screws 38. The cover 22 is then removed from the chassis of the computer 12 by removing the screws 38, sliding the cover in a forward direction as shown by the horizonal arrow in FIG. 1, and then lifting the cover vertically as shown by the vertical arrow in FIG. 1. The cover 22 can then be set aside and the interior of the chassis of the computer is accessible. When the service is complete, the above steps are simply reversed to place the computer 12 in its normal position in the rack system 10.

In the event it is only necessary to access the front of the components of the computer 12, including the drive assemblies mentioned above, the bezel 24 can be pivoted to the position of FIG. 2 and not removed.

Figure 3:
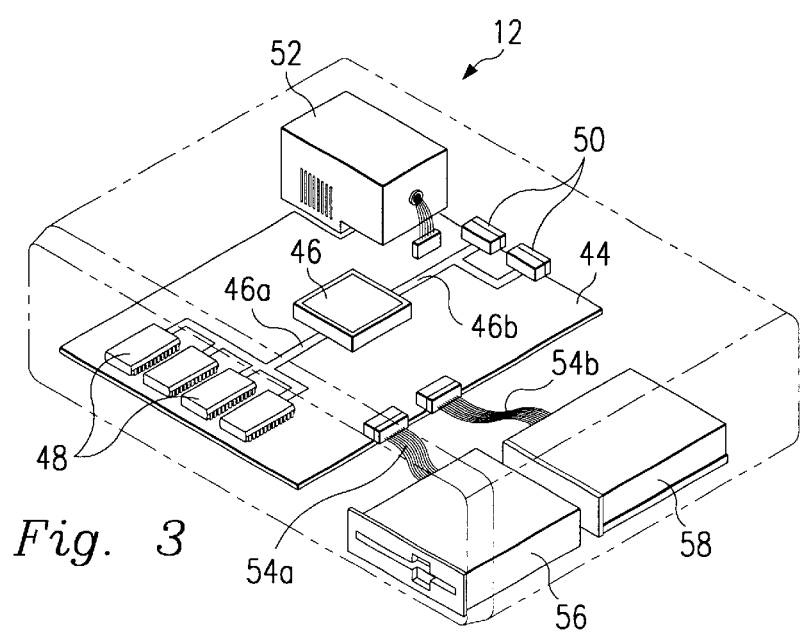
FIG. 3 is a diagrammatic view of one of the computers of FIG. 1.

The components contained in the chassis of the computer 12 are shown in FIG. 3. More particularly, a motherboard 44 is mounted in the interior of the chassis of the computer in any known manner, and a processor 46, a plurality of memory modules 48, and two input/output (I/O) devices 50 are mounted on the motherboard 44. Two buses 46a and 46b are also provided on the motherboard 44 and connect the processor 46 to the memory modules 48 and to the input/output devices 50, respectively. A power supply 52 is connected to the motherboard 14, and a pair of cable assemblies 54a and 54b connect the motherboard to a hard drive assembly 56 and a disk drive unit 58, respectively. It is understood that because the computer 12 is shown, for the purposes of example, as being in the form of a server, and because three hard drives are shown in FIG. 2, two additional hard drives would also be connected to the motherboard 44 by appropriate cabling. Also, other components, electrical traces, electrical circuits and related devices (not shown) are provided in the chassis 12. Because these are all conventional, they will not be described in any further detail.

The present embodiment thus enjoys several advantages. For example, all the space-efficiency advantages of a rack system are retained while the covers of the computers can easily be removed without the use of tools to enable the computers to be serviced without having to remove them from the shelves of the rack system, without having to disconnect the cables attached to the computers, and without requiring access to the rear of the rack system. Also, the bezel normally hides the screws that attach the covers to the chassis, and provides cosmetic gap control between the bezel and the cover.

It is understood that variations may be made in the foregoing without departing from the scope of the present disclosure. For example, the computer is not limited to a server but can be in the form of a personal computer, or the like. Also, it is understood that the computers of the embodiment described above is not limited to the specific orientation with respect to the rack system. In this context the reference to "front", "rear", "side", "top", and "bottom" is for the purpose of example only and is not deemed to be limiting. Also, the embodiment describe above is not limited to a computer but is equally applicable to other components confined in a relatively small space and requiring access to their interiors. Further, the computers can be mounted on slidable shelves in the rack system for movement between their retracted and extended positions.

It is also understood that other modifications, changes and substitutions are intended in the foregoing disclosure and in some instances some features of the disclosure will be employed without a corresponding use of other features. Accordingly, it is appropriate that the appended claims be construed broadly and in a manner consistent with the scope of the disclosure.

What is claimed is:

1. A computer comprising:

a chassis adapted to be placed on a rack system with a wall thereof extending toward a front portion of the rack system;

a memory disposed in the chassis;

a storage disposed in the chassis;

a cover for a top portion of the chassis, the cover being slidable towards a front wall of the chassis to permit its removal without removing the chassis from the rack system;

at least one fastener extending through the cover for attaching the cover to the chassis;

a bezel for the front wall of the chassis and covering the fastener, the bezel being connected to the chassis by at least one hinge assembly which permits the bezel to sequentially pivot away from the front wall and separate from the chassis;

the chassis further comprising a rear wall and two side walls; and a mounting flange associated with the cover and extending from the cover over the front wall of the chassis, the fastener extending through the mounting flange.

2. The computer of claim 1 wherein the mounting flange prevents slidable movement of the cover relative to the chassis towards the rear wall of the chassis.

3. The computer of claim 1 wherein the bezel pivots from an opened position in which the front wall and the fastener are exposed, to a closed position in which the front wall and fastener are covered.

4. The computer of claim 3 wherein there are a plurality of fasteners.

5. In combination:

a rack system;

a chassis;

at least one slidable unit adapted to mount the chassis in the rack system for movement between an extended position and a retracted position;

the chassis comprising a cover for a top portion of the chassis, the cover being slidable towards a front wall of the chassis to permit its removal when the chassis is in its extended position;

at least one fastener extending through the cover for attaching the cover to the chassis;

a bezel for the front wall of the chassis and covering the fastener, the bezel being connected to the chassis by at least one hinge assembly which permits the bezel to sequentially pivot away from the front wall and separate from the chassis;

the chassis further comprising a rear wall and two sidewalls; and a mounting flange associated with the cover and extending from the cover over the front wall of the chassis, the fastener extending through the mounting flange.

6. The combination of claim 5 wherein the mounting flange prevents slidable movement of the cover relative to the chassis towards the rear wall of the chassis.

7. The combination of claim 5 wherein the bezel pivots from an open position in which the front wall and the fastener are exposed, to a closed position in which the front wall and the fastener are covered.

8. The combination of claim 5 wherein the chassis is the chassis for a computer.

9. The combination of claim 5 wherein there are a plurality of fasteners.

10. A computer comprising:

a chassis adapted to be placed on a rack system;

a memory disposed in the chassis;

a storage disposed in the chassis;

a cover for a top portion of the chassis, the cover being slidable towards a front wall of the chassis to permit its removal without removing the chassis from the rack system;

at least one fastener extending through the cover for attaching the cover to the chassis;

a bezel for the front wall of the chassis and covering the fastener, the bezel being connected to the chassis by at least one hinge assembly; and a mounting flange associated with the cover and extending from the cover over the front wall of the chassis, the fastener extending through the mounting flange.

* * * * *